United States Patent [19]

Babu et al.

[11] Patent Number: 5,559,164

[45] Date of Patent: Sep. 24, 1996

[54] RADIATION CURABLE SATURATED POLYOLEFIN PRESSURE SENSITIVE ADHESIVE

[75] Inventors: Gaddam N. Babu, Woodbury; James R. Peterson, St. Paul, both of Minn.

[73] Assignee: Minnesota Mining and Manufacturing Company, St. Paul, Minn.

[21] Appl. No.: 348,337

[22] Filed: Dec. 2, 1994

Related U.S. Application Data

[63] Continuation-in-part of Ser. No. 799,118, Nov. 27, 1991, abandoned.

[51] Int. Cl.$^6$ ....................................................... C08J 3/28
[52] U.S. Cl. ......................... 522/157; 522/161; 428/41.3
[58] Field of Search .............................. 428/40; 522/157, 522/161

[56] References Cited

U.S. PATENT DOCUMENTS

| | | | |
|---|---|---|---|
| 2,484,529 | 11/1949 | Roedel | 204/158 |
| 2,532,011 | 11/1950 | Dahlquist et al. | 154/53.5 |
| 2,933,480 | 4/1960 | Gresham et al. | 260/80.5 |
| 3,542,717 | 11/1970 | Lipman | 260/27 |
| 3,635,755 | 1/1972 | Balinth et al. | 117/122 P |
| 3,933,769 | 1/1976 | Lal et al. | 260/80.78 |
| 3,954,697 | 5/1976 | McConnell et al. | 526/350 |
| 3,955,014 | 5/1976 | Mostev et al. | 427/54 |
| 3,957,724 | 5/1976 | Schurb et al. | 260/46.5 |
| 4,167,415 | 9/1979 | Higuchi et al. | 96/115 R |
| 4,178,272 | 12/1979 | Meyer, Jr. et al. | 260/27 R |
| 4,288,358 | 9/1981 | Trotter et al. | 260/31.8 |
| 4,477,636 | 10/1984 | Muroi et al. | 525/444 |
| 4,533,566 | 8/1985 | Evans et al. | 427/44 |
| 4,727,113 | 2/1988 | Kohyama et al. | 525/193 |
| 4,990,585 | 2/1991 | Kawata et al. | 526/348.5 |
| 5,112,882 | 5/1992 | Babu et al. | 522/158 |
| 5,194,501 | 3/1993 | Babu et al. | 525/103 |
| 5,202,361 | 4/1993 | Zimmerman et al. | 522/120 |
| 5,227,442 | 7/1993 | Babu et al. | 526/279 |
| 5,294,668 | 3/1994 | Babu | 525/80 |

FOREIGN PATENT DOCUMENTS 856337 11/1970 Canada.
59-157106 9/1984 Japan.

*Primary Examiner*—Mark Chapman
*Attorney, Agent, or Firm*—Gary L. Griswold; Walter N. Kirn; David G. Burleson

[57] ABSTRACT

Compositions radiation-curable to pressure sensitive adhesives comprise (1) one or more copolymers of α-olefins of which 90.1 to 99 mole percent are one or more straight chain α-olefins, having 2 to 10 carbon atoms of which at least 55% have 6 to 10 carbon atoms, and 9.9 to 0.1 mole percent are one or more α-olefins having 6 to 20 carbon atoms and at least one methylidyne group; (2) an effective amount of a photoactive hydrogen abstracting agent; and, optionally, (3) a tackifying resin. The compositions, on exposure to radiation, provide adhesive films useful in adhesive applications, especially where a bonded article is to be used at elevated temperatures.

20 Claims, No Drawings

RADIATION CURABLE SATURATED POLYOLEFIN PRESSURE SENSITIVE ADHESIVE

This is a continuation-in-part application of U.S. patent application Ser. No. 07/799,118, filed Nov. 27, 1991, now abandoned.

FIELD OF THE INVENTION

This invention relates to radiation curable poly($\alpha$-olefin) pressure sensitive adhesive compositions and to laminated structures made therefrom. These compositions have improved resistance to oxidative degradation and superior cohesive strength, even without the use of tackifiers, at ambient and elevated temperatures.

BACKGROUND OF THE INVENTION

Achieving better control over mechanical and process properties so that adhesives can be tailored for specific, highly demanding end-use applications such as packaging, medical, and masking tapes is a continuing need in the pressure sensitive adhesive (PSA) art. Each end use application requires a different balance of properties.

Among the earliest polymers to provide a reasonable balance of the properties required for satisfactory PSA performance were the natural and synthetic rubbers. However, these PSAs had poor aging properties, and the need to eliminate ethylenically unsaturated groups from the polymer backbone of rubber adhesives to improve their oxidative stability was eventually recognized.

With the discovery of Ziegler-Natta (ZN) catalysts, polymerization of $\alpha$-olefin monomers to high molecular weights became possible. Homopolymers of $C_6$ to $C_{10}$ $\alpha$-olefins were naturally tacky, had low toxicity, good aging properties, and favorable environmental stability (i.e., low oxidation). These homopolymers were also chemically inert, resistant to plasticizer migration, and relatively inexpensive. They were, therefore, good candidates for PSA applications. However, their poor cohesive strength meant that they lacked the characteristics necessary for use at elevated temperatures.

Radiation curing frequently has been used to crosslink the polymeric component of adhesives in attempts to increase the cohesive strength of coated adhesive films. The results have not been completely satisfactory because degradation (i.e., chain scission) competes with the desired crosslinking reaction. Therefore, in some PSA systems, especially those formulated from polymers containing propylene, radiation curing leads to a loss of cohesive strength and shear adhesion.

Adhesives derived primarily from $C_6$ or larger $\alpha$-olefins are well known in the art. In U.S. Pat. No. 3,542,717, poly($\alpha$-olefin) adhesive compositions comprising mixtures of polyolefin copolymers derived from olefin monomers with different molecular weights (i.e., olefins with 11 to 20 carbon atoms, and different $\alpha$-olefins with 4 to 20 carbon atoms) are described. The resulting adhesive has high shear and peel adhesion at room temperature but is unacceptable for most high temperature applications due to low cohesive strength and shear adhesion.

U.S. Pat. No. 3,635,755 describes PSA polyolefins suitable for use as single component PSAs for surgical tapes that are substantially non-allergenic. Such adhesives can be made from homopolymers of the $C_6$ to $C_{11}$ $\alpha$-olefins or from interpolymers of $C_2$ to $C_{16}$ $\alpha$-olefins having an intrinsic viscosity of 1.5 to 7.0, a Williams plasticity of 0.8 to 4.0, and an acetone/heptane soluble fraction of less than 25% by weight. Tapes made from these adhesives have low shear adhesions that facilitate non-irritating removal from the skin. However, their low shear adhesion makes these materials unsuitable for masking or packaging tape applications.

U.S. Pat. Nos. 3,954,697 and 4,178,272 describe hot melt adhesives, useful for sealing polyethylene films, derived from copolymers of propylene and $C_6$ to $C_{10}$ $\alpha$-olefins. The '697 patent teaches that, although $C_6$ or $C_8$ $\alpha$-olefin copolymers are permanently tacky, they have poor cohesive strength and, consequently, lack shear adhesion. Therefore, higher $\alpha$-olefins must be copolymerized with propylene to meet "the critical property requirements for a pressure sensitive adhesive material." One such a property, cohesive strength, is discussed at col. 1, lines 34–48. The copolymer must contain more than 40 mole percent propylene, especially if static shear is to exceed 1000 minutes.

The '272 patent describes compositions comprising a ZN catalyst system and discloses process conditions useful in preparing the tacky copolymers required for PSAs. Also disclosed are stereoregulating, three-component ZN catalyst systems that produce high molecular weight, crystalline block copolymers unsuitable for PSA applications (col. 2, lines 39–65) but which are said to be useful in sealing bags, cartons, and on an adhesive for floor tiles.

U.S. Pat. No. 4,288,358 describes hot melt adhesive compositions containing terpolymers of propylene, either 1-butene or 1-pentene, and $C_6$ to $C_{10}$ $\alpha$-olefins; tackifying resins; and plasticizing oils. Efforts to simultaneously optimize the adhesive and process properties of these compositions are described.

The preceding references teach optimized processing conditions for preparation of hot melt adhesives that are readily coatable or extrudable at the melt temperature. However, these hot melt adhesives have poor PSA properties. In particular, they have poor adhesion under shear. High temperature masking tapes used in the automotive industry must have good shear adhesion at elevated temperatures.

Attempts to radiation crosslink these poly($\alpha$-olefin) adhesives that contain propylene led to degradation of PSA properties (e.g., shear adhesion).

U.S. Pat. Nos. 2,933,480 and 3,933,769 describe a process for copolymerizing mixtures of $\alpha$-olefins and non-conjugated diolefins to yield sulfur-vulcanizable unsaturated elastomers described as "rubber-like" or "rubbery".

U.S. Pat. No. 4,990,585 discloses a hexene-¼-methylpentene-1 random copolymer, plus a process for producing the copolymer, which is said to be useful as a rubber vibration insulator, a modifier for plastics and rubbers, and an adhesive.

U.S. Pat. No. 5,112,882 describes adhesive tapes that include radiation curable poly($\alpha$-olefin) PSA compositions with superior cohesive strength and shear adhesion. These compositions, which optionally can contain tackifiers, have desirable peel adhesion, shear strength, and stability against oxidative degradation at low and moderate temperatures.

SUMMARY OF THE INVENTION

Briefly, the present invention provides a composition that comprises a) at least one copolymer having the general formula

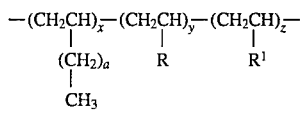

wherein x, y, and z are numbers designating the relative molar amounts of monomer units comprising the backbone chain of the copolymer such that (1) the sum (x+y+z) is about 35 to 400,000, and
(2) z is 0.1 to 9.9%, y is 0 to 30%, and x is 60.1 to 99.9% of the sum (x+y+z);

a is an integer from 3 to 7, inclusive;
R is hydrogen or a lower alkyl group; and
$R^1$ is a monovalent organic group, having the structure

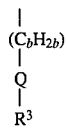

wherein b is an integer from 1 to 5,
Q is a single bond, oxygen, or a divalent group selected from the class consisting of an arylene group having 6 to 15 carbon atoms and

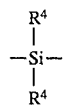

in which each $R^4$ is independently an alkyl group of 1 to 4 carbon atoms or $R^3$; and $R^3$ is a methylidyne group having the formula

in which (1) each $R^5$ is independently an alkyl group having 1 to 4 carbon atoms or
(2) both $R^5$s together provide an alkylene group that, with the methylidyne carbon to which they are attached, forms a 5- or 6-membered ring of carbon atoms, with the proviso that b can be zero when Q is an arylene group;

b) sufficient photoactive hydrogen abstracting agent to crosslink the composition upon exposure to radiation; and c) optionally, a tackifying resin, the composition being radiation curable to a pressure sensitive adhesive having peel adhesion of at least 30 N/dm whether or not a tackifying resin is present.

After curing, the composition provides a PSA with peel adhesion of 30 N/dm or more, preferably 35 N/din or more, and cohesive stability even at temperatures above 120° C. This is true regardless of whether the composition contains a tackifying resin and is in contrast to those compositions described in U.S. Pat. No. 5,112,882, which require the presence of a tackifying resin if a peel adhesion of 30 N/dm is consistently desired. Such a PSA can be of particular use in tapes required for high temperature masking and hot melt adhesive applications.

The compositions of the present invention comprise one or more α-olefin copolymers derived from α-olefin monomers containing 6 to 10 carbon atoms and one or more photoactive hydrogen abstracting agents. The term "copolymers" include ter- and tetrapolymers.

The polymers of the present invention do not contain residual ethylenic unsaturation. Rather, they contain pendent side groups having readily reactive hydrogen atoms on tertiary carbon atoms. When these polymers are exposed to radiation such as ultraviolet (UV) or electron beam (E-beam), preferably in the presence of a photoactive hydrogen abstracting agent, they crosslink. (Where E-beam radiation is used for curing, no photoactive hydrogen abstracting agent is needed.) This leads to an improvement in the cohesive strength of the adhesive.

Because ethylenic unsaturation is not present in the copolymers of the present invention, cured adhesives prepared from them have improved elevated temperature oxidative stability, possess excellent adhesive and chemical/electrical resistance properties, and are physiologically inert. These properties make them excellent PSAs for a wide range of applications where independent control of peel and shear adhesion are desirable.

The polymers of the composition of the present invention preferably have a glass transition temperature ($T_g$) in the range of −70° C. to 0° C., more preferably in the range of −60° to −20° C., and an inherent viscosity in the range of 0.4 to 9.0 dl/g, more preferably 0.5 to 6.0 dl/g, and most preferably 1.5 to 4.0 dl/g. Number average molecular weights of the polymers are in the range of 5,000 to 50,000,000, preferably 50,000 to 5,000,000.

The present invention provides a composition that can be radiation cured to a PSA with an improved balance of peel and shear adhesion. More specifically, these PSAs have peel adhesions of at least 30 N/dm and preferably have shear strengths at 70° C. of at least 100 minutes, more preferably have shear strengths at 70° C. of at least 1000 minutes, and most preferably shear strengths at 70° C. of at least 5000 minutes. Peel and shear adhesion values can be varied independently to meet various end use requirements.

Adhesive layers made from the composition of the present invention have peel values greater than 30 N/dm, preferably 35 N/dm, regardless of whether the composition includes a tackifying resin. Also, because the polymer component of the composition is free of unsaturation either in the backbone or in pendent groups, the thermal stability of the composition of the present invention is superior to compositions containing unsaturated polymers, which makes them useful in hot melt adhesives. Specifically, adhesive layers derived from the composition of the present invention resist oxidative degradation up to at least 200° C. Further, gelation during hot melt extrusion of the composition of the present invention is minimal or does not occur.

The adhesive of the invention can be applied to appropriate substrate surfaces by a wide range of processes (including solution coating, solution spraying, hot melt extrusion, emulsion coating, etc.) to make adhesive tapes, adhesive transfer films, and the like.

In this application, the following definitions apply unless otherwise indicated:

"α-olefin copolymer" means a random polymer derived from two or more terminal monoethylenically unsaturated monomers;

"straight-chain α-olefin" means a linear hydrocarbon having terminal ethylenic unsaturation and no functional groups;

"α-olefin having at least one methylidyne group" means an organic compound having a terminal ethylenic unsaturation and at least one group comprising a carbon atom bonded to three other carbon atoms and one hydrogen atom;

"film" means a layer or a support and a self-supporting layer;

"photoactive hydrogen abstracting agent" means a compound that, under the influence of radiation, initiates polymer chain growth by removing the hydrogen atom from a methylidyne carbon; and "lower alkyl" means a $C_1$ to $C_5$ alkyl group.

DETAILED DESCRIPTION OF PREFERRED EMBODIMENTS

The radiation curable α-olefin polymers of the composition of the present invention have the general formula

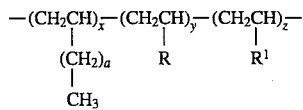

wherein x, y, and z are numbers designating the relative molar amounts of monomer units comprising the backbone chain of the copolymer such that (1) the sum (x+ y+ z) is about 35 to 400,000, and (2) z is 0.1 to 9.9%, preferably 1 to 9.9%, more preferably from 1 to 4.9%, y is 0 to 30%, preferably 0.1 to 30%, and x is 60.1 to 99.9%, preferably 60.1 to 95%, of the sum (x+ y+ z);

a is an integer from 3 to 7, inclusive;

R is hydrogen or a lower alkyl group; and $R^1$ is a monovalent organic group, having the structure

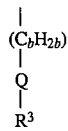

wherein b is an integer from 1 to 5,

Q is a single bond, oxygen, or a divalent group selected from the class consisting of an arylene group having 6 to 15 carbon atoms and

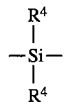

in which each $R^4$ is independently an alkyl group of 1 to 4 carbon atoms or $R^3$; and $R^3$ is a methylidyne group having the formula

in which (1) each $R^5$ is independently an alkyl group having 1 to 4 carbon atoms or (2) both $R^5$s together provide an alkylene group that, with the methylidyne carbon to which they are attached, forms a 5- or 6-membered ring of carbon atoms, with the proviso that b can be zero when Q is an arylene group.

These copolymers are prepared by copolymerizing one or more straight chain α-olefins and one or more methylidyne group-containing α-olefins.

Straight chain α-olefins that can be used include those with six to ten carbon atoms (namely, 1-hexene, 1-heptene, 1-octene, 1-nonene, and 1-decene) and, optionally, those with two to five carbon atoms (namely, ethylene, propylene, 1-butene, and 1-pentene). The $C_6$ to $C_{10}$ α-olefins can be present in an amount of from 60.1 to 99.9 mole percent, preferably 60.1 to 95 mole percent. The $C_2$ to $C_5$ α-olefins can be present in an amount of from 0 to 30 mole percent, preferably from 0.1 to 30 mole percent, more preferably from 1 to 25 mole percent.

Suitable methylidyne group-containing α-olefins that can be used have 6 to 20 or more carbon atoms. Examples include, 4-methyl-1-pentene, 5-methyl-1-hexene, 4-methyl-1-hexene, ethenylcyclopentane, 6-methyl-1-heptene, 5-methyl-1-heptene, 4-methyl-1-heptene, 4,5-dimethyl-1-hexene, 4-ethyl-1-hexene, ethenylcyclohexane, 7-methyl-1-octene, 8-methyl-1-nonene, 4,6-dimethyl-1-heptene, allylcyclohexane, 2-ethenylbicyclo[2.2.1]heptane (i.e., 2-ethenylnorborane, which has three methylidyne groups), 2-ethenyl-6-methylbicyclo[2.2.1]heptane (which has four methylidyne groups), 2-ethenyl 6-methylbicyclo[2.2.1]heptane (which has four methylidyne groups), 2-(3-propenyl)bicyclo[2.2.1] heptane (i.e., propenylnorborane, which has three methylidyne groups), 3-(3-propenyl)-2,6,6-trimethylbicyclo[3.1.1] heptane (i.e., 3-propenylpinane, which has four methylidyne groups), 1-ethenylpentacyclo[4.2.0.0$^{2,5}$.0$^{3,8}$.0$^{4,7}$]octane (i.e., ethenylcubane, which has seven methylidyne groups), 1-ethenyltricyclo[3.3.1.1$^{3,7}$]decane (i.e., ethenyladamantane, which has three methylidyne groups), and 1,2-dimethyl-5-ethenyltricyclo[3.3.1.1$^{3,7}$]decane (i.e., 1,2-dimethyl-5-ethenyladamantane, which has three methylidyne groups).

Other methylidyne group-containing α-olefins that are suitable for use in the copolymers of the invention are the arylene, the catenary oxygen, and the catenary silicon group-containing α-olefins, such as, for example, 4-(1-methylethyl)-1-(3-propenyl)benzene, 4-(2-methylpropyl)-1-(3-propenyl)benzene, 2-(1-methylethyl)-4-pentyl-3-propenylnaphthalene, 3-(2-methylpropoxy)-1-propene, 4-(2-methylpropoxy)-1-butene, 3-cyclohexoxy-1-propene, dimethyl(1-methylethyl)-3-propenylsilane, bis(1-methylethyl)methyl-3-propenylsilane, and bis(1-methylethyl)methyl-4-butenylsilane.

The α-olefin monomers can be polymerized rapidly and in good yields in the presence of ZN catalysts over a wide range of temperatures, e.g., 0° to 140° C., preferably 30° to 90° C. The amount of catalyst used is preferably in the range of 0.1 to 5 g per kg of monomer, more preferably 0.2 to 2 g per kg of monomer. (A summary of ZN polymerizations can be found in Odian, "Principles of Polymerization", 2d ed., Ch. 8.4 (J. Wiley & Sons, New York, 1981). For a more detailed discussion of the polymerization of olefins, see Boor, "Ziegler-Natta Catalysts and Polymerizations", Ch. 19 (Academic Press, New York, 1979).)

The polymerization of α-olefin monomers can be performed in bulk or in one or more inert solvents. Examples of inert solvents include, but are not limited to, aliphatic, aromatic, and cycloaliphatic hydrocarbon solvents such as hexane, heptane, benzene, toluene, cyclopentane, and cyclohexane.

Copolymers can be made from one or more of the above-described straight chain α-olefins and from 0.1 to 9.9 mole percent, preferably 1 to 9.9 mole percent, more preferably from 1 to 4.9 mole percent, of one or more methylidyne group-containing α-olefins. By varying the composition and ratio of these monomers, copolymers can be prepared that yield PSA films with peel, gel content, and shear adhesive properties required for various end use applications.

PSA films can be prepared by adding one or more photoactive hydrogen abstracting agents to the copolymer to form an adhesive precursor which is then coated onto a substrate. Suitable photoactive hydrogen abstracting agents include, but are not limited to, aldehydes, such as benzaldehyde, acetaldehyde, and their substituted derivatives; ketones, such as acetophenone, benzophenone, and their substituted derivatives (particularly the 4-alkylbenzophenones, wherein the alkyl group has 1 to 18 carbon atoms, and commercially available derivatives such as Sandoray™ 1000 (Sandoz Chemicals, Inc.; Charlotte, N.C.)); quinones, such as the benzoquinone, anthraquinone, and their substituted derivatives; thioxanthones, such as 2-isopropylthioxanthone and 2-dodecylthioxanthone; and certain chromophore-substituted halomethyl-sym-triazines, such as 2,4-bis(trichloromethyl)-6-(3',4'-dimethoxyphenyl)-sym-triazine. Photoactive hydrogen abstracting agents that are preferred because (1) they are particularly effective in bringing about rapid gelation of the adhesive composition on application of radiation, (2) they have low vapor pressures, and (3) they have good thermal stability, are polyfunctional benzophenones (i.e., compounds having an aliphatic, aromatic, nitrogenous, silicic, or hetero atomic nuclei to which two to four benzoylphenoxy groups are attached). Examples of such compounds include

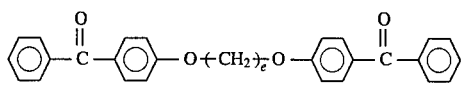

in which e is an integer from 2 to 4;

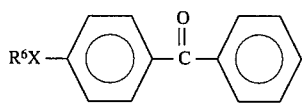

in which $R^6$ is hydrogen or an alkyl group having 1 to 18 carbon atoms and X

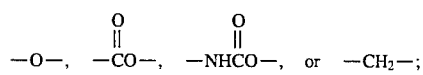

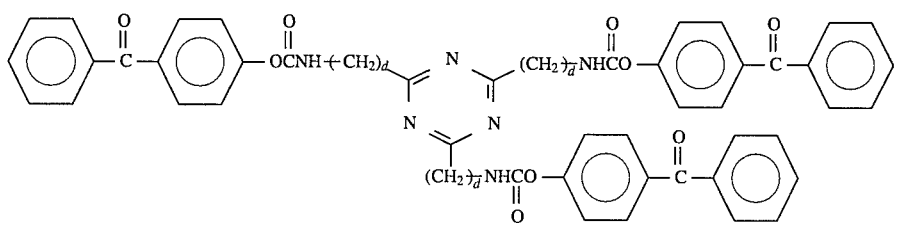

in which d is an integer from 1 to 6; and

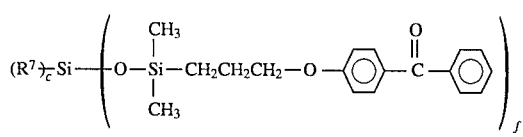

in which $R^7$ is an alkyl group having 1 to 18 carbon atoms, c is an integer from 1 to 4, and f is 4−c.

Photoactive hydrogen abstracting agent can be present in a concentration of from 0.05 to 3.0% (by wt.), preferably 0.1 to 2.0% (by wt.), more preferably 0.5 to 1.5% (by wt.), of the curable composition. If E-beam radiation is used to crosslink the copolymer, photoactive agent need not be used.

To cure the composition of the present invention, a source of actinic radiation of sufficient energy (i.e., wavelength range) to generate free radicals when incident upon the particular photoactive hydrogen abstracting agent selected for use in the composition should be chosen. The preferred wavelength range for the photoactive hydrogen abstracting agents disclosed above is 400 to 250 nm. The amount of radiant energy required to crosslink the adhesive film of the invention is 100 to 1500 $mJ/cm^2$, more preferably 200 to 800 $mJ/cm^2$, as measured by a UVIRAD™ UM365H light bug (E.I.T. Inc.; Sterling, Va.). (If a UVIMAP™ UM365H-S light bug is used, the amount of radiant energy required is found to be about 3.5 greather than the energy values measured by the UVIRAD™ bug.) Details of the photocure process are disclosed in U.S. Patent Nos. 4,181,752 and 4,329,384. (Because the adhesive composition of the present invention contains a polymer, the prepolymerization (i.e., the making of a syrup) step disclosed in the '752 and '384 patents can be omitted in photocuring the compositions of the present invention.)

Even in the absence of photoactive hydrogen abstracting agent, the composition of the present invention can also be cured using E-beam radiation. The dosage needed to crosslink the composition of the present invention varies depending on the particular composition but generally ranges from 1 to 20 Mrads, preferably from 2 to 10 Mrads. Details of a suitable process for E-beam curing of adhesive-coated substrates can be found in U.S. Pat. No. 4,533,566, which is hereby incorporated herein by reference.

The photoactive hydrogen abstracting agent, when present, can extract the tertiary hydrogen from a methylidyne group and allow open-bonded segments to join and form a crosslinked polymer. Where the photoactive agent is polyfunctional, it can extract tertiary hydrogens at more than one site and become incorporated into the polymer as a linking group.

Addition of one or more tackifying resins to the inventive composition can provide a PSA having improved tack, lower melt viscosity, improved coatability, good heat stability, and improved peel adhesion. Compatible tackifying resins useful in the compositions of the present invention include resins derived from the polymerization of unsaturated hydrocarbon monomers having five to nine carbon atoms, polyterpenes, synthetic polyterpenes, and the like. Hydrocarbon tackifying resins can be prepared by polymerization of monomers consisting primarily of olefins and diolefins and include, for example, residual byproduct monomers of the isoprene manufacturing process. These hydrocarbon tackifying resins typically exhibit Ball and Ring Softening Points of from about 800° C. to about 145° C.; Acid Numbers of from about 0 to 2; and Saponification values of less than one. Examples of commercially available resins based on a $C_5$ olefin fraction of this type are Wingtack™ 95 and Wingtack™ 115 (i.e., Wingtack Plus™) tackifying resins (Goodyear Tire and Rubber Co.; Akron, Ohio). Other hydrocarbon resins include Regalrez™ 1078 and Regalrez™ 1126 tackifying resins (Hercules Chemical Co. Inc.; Wilmington, Del.); Arkon™ resins, such as Arkon™ P115 tackifying resin (Arakawa Forest Chemical Industries; Chicago, Ill.); and Escorez™ resins (Exxon Chemical Co.; Houston, Tex.).

Other suitable tackifying resins include the terpene polymers, such as polymeric resinous materials obtained by polymerization and/or copolymerization of terpene hydrocarbons such as the alicyclic, mono, and bicyclic monoterpenes and their mixtures, including carene, isomerized pinene, terpinene, terpentene, and various other terpenes. Commercially available resins of the terpene type include the Zonarez™ terpene B-series and 7000 series tackifying resins (Arizona Chemical Corp.; Wayne, N.J.). Typical properties reported for the Zonarez™ terpene resins include Ball and Ring Softening Points of about 55° C. to 125° C. (ASTM E28-67), Acid Numbers of less than one (ASTM D465-59) and Saponification Numbers of less than one (ASTM D464-59). The terpene resin used in the following examples is a poly(beta-pinene) resin, Piccolyte™ A115 resin (Hercules Chemical Co.), which has a Ball and Ring Softening Point of 115° C., an Acid Number of one, and an Iodine Number of 190.

Where stability at elevated temperatures is desired, saturated tackifying resins are used.

When present, the total amount of tackifying resin in the composition is more than 0 to 150 parts by weight (pbw), more preferably 5 to 50 pbw, most preferably 25 to 35 pbw, per 100 pbw of polymer. Saturated tackifying resins such as the aforementioned Regalrez™ 1078 and Arkon™ P115 resins are preferred because they yield a higher gel content than upon equivalent treatment by an activated crosslinking agent.

One or more additives can also be included in the composition to provide adhesives for special end uses. Such additives can include pigments, dyes, plasticizers, fillers, stabilizers, ultraviolet absorbers, antioxidants, processing oils, and the like. The total amount of these additives can range from 0.1 to 50 weight percent, depending on the end use desired.

The adhesive composition of the present invention can be coated from solution by any of a variety of coating processes well known in the art including knife coating, roll coating, gravure coating, curtain coating, etc. Useful coating thicknesses range from 12.5 to 500 μm, preferably from 25 to 200 μm, more preferably from 40 to 150 μm . Some compositions of the present invention can be applied by various extrusion coating processes in a solventless manner, thereby eliminating the environmental and toxicity problems associated with solution coating processes.

Shear adhesion of the tackified compositions can be enhanced by radiation cure with no loss of peel adhesion. High internal strength of the adhesive is necessary in box sealing tapes and masking applications in the automotive industry.

A PSA tape can be made from the radiation-curable, saturated polyolefin composition of the present invention by (1) coating onto a substrate a composition that comprises a copolymer having the general formula shown above, an effective amount of a photoactive hydrogen abstracting agent described previously, and, optionally one or more tackifying resins, preferably a saturated tackifying resin and (2) exposing the coated substrate to sufficient actinic or E-beam radiation to effect crosslinking of the composition so as to provide a PSA. The source of actinic radiation can be from, for example, an RPC Processor QC1202 ANIR (PPG Industries; Chicago, Ill.) with the coated substrate moving at 30 cm/sec, the mercury vapor lamps being approximately 9.5 cm from the coated surface. When the crosslinking step is effected by E-beam radiation, no photoactive hydrogen abstracting agent need be present.

Crosslinked adhesive films derived from the composition of the present invention preferably have a gel content (when corrected for soluble tackifying resins and other additives as hereinafter described) in the range of from 2 to 95 weight percent, more preferably from 30 to 80 weight percent, and most preferably from 50 to 70 weight percent.

A wide range of materials can be used as substrates. Common examples include polymeric supports such as polyethylene terephthalate (Dupont Chemical Co.; Wilmington, Del.), hereinafter "PET", and biaxially oriented polypropylene (Toray Chemical Co., Ltd., Tokyo, Japan, or Mobil Polymers U.S., Inc., Norwalk, Conn.), hereinafter "BOPP"; woven and nonwoven fabrics; metals and metal foils such as aluminum, copper, lead, gold, and the like; paper; glass; ceramics; and composite materials comprised of laminates of one or more of these materials.

A laminated structure of at least a first and a second substrate (e.g., polyethylene and polypropylene) joined by a layer of the composition of the present invention is also possible. Preferably, at least one of the substrates is capable of transmitting actinic or E-beam radiation so that the radiation-curable layer can be crosslinked.

In some applications, primers can be used to improve the adhesion of the composition to some substrates. Useful primers for the practice of the present invention include a triblock copolymer of styrene-ethylene/butylene-styrene grafted with maleic anhydride, commercially available as Kraton™ G- 1901X copolymer (Shell Chemical Co.; Houston, Tex.) and a combination of amorphous polypropylene and Kraton™ G-1901X copolymer.

Release liners, such as those described in U.S. Pat. Nos. 4,386,135, 3,957,724, and 2,532,011, form a special class of substrates on which the composition of the invention can be coated and subsequently radiation cured to form adhesive transfer films. These are particularly useful when a laminated structure is desired.

PSA tapes and transfer films are preferred articles of the invention.

Test Methods

The test procedures used in the following examples to evaluate and compare the properties of the PSA compositions and tapes made from them are industry standard tests. These tests are described in detail in various publications of the American Society for Testing Materials (ASTM), Philadelphia, Pa., and the Pressure Sensitive Tape Council (PSTC), Glenview, Ill. References to these standards are also given. Shear Strength (ASTM D-2654-78; PSTC - 7)

Shear strength is a measure of the cohesiveness or internal strength of an adhesive, i.e., the amount of force required to pull an adhesive strip from a standard flat surface in a direction parallel to the surface to which it has been affixed with a definite pressure. It is measured by determining the amount of time (in minutes) required to pull a standard area of PSA coated sheet material from a stainless steel test panel under stress of a constant, standard load.

Tests were conducted on adhesive coated strips applied to a stainless steel panel such that a portion of each strip (a 12.7 mm× 12.7 mm or a 25.4 mm×25.4 mm portion at 25° C., and a 25.4 mm× 12.7 mm at 70° C.) was in firm contact with the panel with one end portion of the tape being free. The panel with coated strip attached was held in a rack such that the coated surface of the panel forms an angle of 182° with the vertical tape free end which is then tensioned by application of a hanging weight from the free end of the coated strip (e.g., 1 kg for tests conducted at 25° C. and 500 g for tests conducted at 70° C.). The 2° greater than 180° helps to negate peel forces, thus ensuring that only shear forces are measured so as to more accurately determine the holding power of the tape being tested.

The amount of time required for each test specimen to separate from the steel panel was recorded as the shear strength.

Mode of Failure (MOF)

Along with each shear measurement, the mode of failure is indicated as follows:

P=pop-off, i.e., 75–100% adhesive failure from steel plate;

S= adhesive split, i.e., both surfaces completely covered by adhesive.

The pop-off failure mode is preferred because it indicates adhesive failure of the adhesive/steel interfacial bond rather than cohesive failure of the adhesive. Depending on the particular end use application, adhesives of various shear adhesions, all within the range of the present invention (1 to 1000 minutes), are preferred.

Two specimens of each tape were tested and the shear tests were averaged to obtain the shear value.

Peel Adhesion (ASTM D 3330-78; PSTC - 1 (11/75))

Peel adhesion is the force required to remove a PSA-coated test specimen from a test panel measured at a specific angle and rate of removal. In the following examples, this force is expressed in Newtons per decimeter (N/dm) of width of the coated sheet. The procedure used is as follows:

1) A 25.4 mm wide test specimen is applied to a horizontally positioned clean glass test plate. A 2.2 kg rubber roller is used to press a 12.7 cm length of specimen into firm contact with the glass surface.

2) The free end of the specimen is doubled back so that it nearly touches itself, i.e., the angle of removal is 180°. The free end is attached to the adhesion tester scale.

3) The glass test plate is clamped in the jaws of a tensile testing machine capable of moving the plate away from the scale at a constant rate of 2.3 m/min.

4) The scale reading (in Newtons) is recorded as the tape is peeled from the glass surface.

Inherent Viscosity (ASTM D 2857-70 (Reapproved 1977))

To fully understand the benefits of this invention, improvements in shear strength and processability need to be related to the molecular weight of the polymeric component of the PSA. To do so, the inherent viscosity (IV) of 10 ml of a 0.5 g/dl polymer solution in a water bath controlled at 25° C. is measured using a Cannon-Fenske #50 viscometer (Cannon Instruments Co.; State College, Pa.). The solvent used is specified in the individual examples.

Percent Gel Test (ASTM D 2616-81)

Percent gel is an indication of the level of cure. Tapes containing tackifying resins are corrected to the actual percent gel. The corrected percent gel is 100 times the gelled mass divided by the total mass of material that is capable of forming a gelled network. Soluble materials such as tackifiers and uncrosslinked polymers are extracted before determining the gel fraction.

Crosslinking by actinic radiation or E-beam improves the creep and shear resistance of PSAs.

Many important properties of crosslinked PSAs vary with gel content. Hence, determination of the gel content provides a means for controlling the process and thereby raising the quality of the tape.

Extraction tests permit verification of the proper gel content of polyolefin PSAs and comparison between different crosslinked adhesives and their specific end uses.

Gel Content Determination

A square test specimen (3.81 cm× 3.81 cm) containing approximately 0.06 g of PSA is cut from a tape and placed in a 120-mesh stainless steel basket measuring approximately 4×8 cm. The contents are weighed to the nearest 0.1 mg and then immersed in a capped beaker containing sufficient toluene to cover the specimen. After extracting the adhesive 24 to 48 hours, the basket containing the specimen is removed, drained, and placed in an oven at 69° C. The specimens are dried to a constant weight, and the gel content is determined as follows:

$$E = \frac{\text{Wt. lost during extraction}}{\text{Wt. of original specimen}} \times 100$$

Gel content = 100 − E wherein E is the extract percentage. For tackified PSA tapes, the weight of the tackifying resin was subtracted before calculating the corrected gel content:

$$E = \frac{\text{Wt. lost during extraction}}{\text{Wt. of specimen without resin}} \times 100$$

Gel content = 100 − E wherein E is defined as above. Two specimens of each tape were tested, and the results were averaged to obtain the gel content value.

Panel Test

This test is used to evaluate the effectiveness of an adhesive as a masking tape at elevated temperatures. In this test, the test surface of an aluminum panel is painted with, for example, an automotive basecoat/clearcoat (BC/cc) acrylic enamel paint system or the automotive 50J™ acrylic enamel paint (Ford Motor Co.; Detroit, Mich.) to which masking tapes are adhered.

Tapes are adhered at room temperature to the test surface, followed by two passes of a 4.5 pound (2 kg) rubber-coated metal roller. After one hour in an air circulating oven at either 121° C. or 150° C., the still hot tape was peeled back at an angle of 45° C. at an approximate rate of 1.9 m/rain across half of the panel. After cooling to room temperature, the tape was peeled from the other half of the panel. The panel was examined visually for any adhesive residue.

Objects and advantages of this invention are further illustrated by the following examples. The particular materials and amounts thereof, as well as other conditions and details, recited in these examples should not be used to unduly limit this invention.

EXAMPLES

Preparation of Copolymer 1

The following reactants were charged in the listed order to a dry, argon-filled, circulating water-jacketed glass reactor equipped with stirrer and condenser: 474 g 1-hexene, 1971 g toluene, 18.75 g 4-methyl-1-pentene (which had been passed through alumina/silica to remove impurities and then dried over molecular sieves), and 2.7 ml diethylaluminum chloride (1.8M in toluene). Copolymerization was initiated by the addition of 0.5 g AATiCl$_3$ (aluminum activated reduced titanium chloride, otherwise known as Stauffer Catalyst). Molecular weight of the copolymer was controlled throughout the reaction period by the introduction of hydrogen at 60 cc/min. The reaction was maintained at 25° C.

After three hours, the reaction was quenched. The polymer was precipitated in a large excess of methanol so as to extract the catalyst residues. The methanol solution was then decanted off of the polymer precipitate. The copolymer was stabilized with 0.25% (by wt.) Irganox™1010 antioxidant (Ciba Geigy) and dried in a vacuum oven at 70°–80° C.

About 320 g (65% conversion) of copolymer was obtained. NMR analysis showed 1.5 mole percent 4-methyl-1-pentene units and 98.5 mole percent 1-hexene units. The polymer had an IV of 2.0 dl/g (at 0.5 g/dl concentration in hexane at 25° C.) and a $T_g$ of −44° C. No crystallinity was detected by differential scanning colorimetry (DSC) analysis.

Preparation of Copolymer 2

The procedure for the preparation of copolymer 1 was repeated with the exception that a different monomer ratio was used: 419 g 1-hexene and 74 g 4-methyl-1-pentene. The copolymerization was run at 50° C. for an hour.

A tacky amorphous copolymer was obtained in 50% conversion having an IV of 1.5 dl/g and a $T_g$ of −38° C. The copolymer was found to contain 6.2 mole percent 4-methyl-1-pentene units.

Preparation of Copolymer 3

The procedure for the preparation of copolymer 1 was repeated with the exception that a different monomer ratio was used: 150 g 1-octene and 12.5 g 4-methyl-1-pentene.

A tacky amorphous copolymer was obtained in 60% conversion having an IV of 2.3 dl/g, a $T_g$ of −59° C., and 1.7 mole percent 4-methyl-1-pentene units.

Preparation of Copolymer 4

The procedure for the preparation of copolymer 1 was repeated with the exception that a different monomer ratio was used: 150 g 1-decene and 10 g 4-methyl-1-pentene).

A tacky amorphous copolymer was obtained in 65% conversion having an IV of 1.9 dl/g. The copolymer contained 3.0 mole percent 4-methyl-1-pentene units.

Examples 1–18

Toluene solutions of each of copolymers 1, 2, 3, and 4 (both radiated and unradiated) and 0.15 or 1.0 weight percent of one of the following photoactive hydrogen abstracting agents were prepared as shown in TABLE I: benzophenone (B); Sandoray™ 1000 crosslinker, a substituted benzophenone (S); 2,4-bis(trichloromethyl)-6-(3', 4'-dimethoxyphenyl)-s-triazine (T); and 2-isopropylthioxanthane (I).

These solutions were coated, using a hand-spread coater, onto 25 µm thick pieces of PET and dried at 80° C. to remove toluene so as to provide adhesive coatings having dry thicknesses of about 37.5 µm. Coatings containing photoactive hydrogen abstracting agent were exposed under nitrogen to various doses of UV radiation. The characteristics of each of the adhesive coatings was determined and is presented below in Table I.

Table I shows that the unradiated compositions did not gel and that adhesive in tapes prepared therefrom failed by splitting. Compositions that were irradiated, however, gelled from about 36 to 80%, depending on the particular copolymer, the crosslinking agent, and the amount of irradiation. Tapes prepared from these irradiated compositions popped off rather than splitting. The peel adhesion of each of these compositions was greater than 35N/dm.

TABLE I

| Example No. | Copolymer | Photoactive H-Abs. Agent Type | Wt. % | Dose (mJ/cm$^2$)[a] | Peel (N/dm) | Shear (min)[b] | MOF | Gel (%) |
|---|---|---|---|---|---|---|---|---|
| 1 | 1 | — | — | — | 56 | 12 | S | 0 |
| 2 | 1 | B | 1.0 | 200 | 39 | 4 | P | 55 |
| 3 | 1 | S | 1.0 | 200 | 43 | 5 | P | 61 |
| 4 | 1 | T | 0.15 | 200 | 45 | 8 | P | 38 |
| 5 | 1 | D | 1.0 | 200 | 48 | 15 | P | 65 |
| 6 | 2 | — | — | — | 57 | 4 | S | 0 |
| 7 | 2 | B | 1.0 | 450 | 38 | 4 | P | 47 |
| 8 | 2 | S | 1.0 | 450 | 48 | 6 | P | 51 |
| 9 | 2 | 1 | 1.0 | 450 | 51 | 10 | P | 36 |
| 10 | 2 | T | 0.15 | 200 | 51 | 23 | P | 55 |
| 11 | 3 | — | — | — | 60 | 1 | S | 0 |
| 12 | 3 | B | 1.0 | 450 | 46 | 5 | P | 80 |
| 13 | 3 | S | 1.0 | 450 | 45 | 5 | P | 77 |
| 14 | 3 | T | 0.15 | 450 | 38 | 6 | P | 63 |

TABLE I-continued

| Example No. | Copolymer | Photoactive H-Abs. Agent Type | Wt. % | Dose (mJ/cm$^2$)[a] | Peel (N/dm) | Shear (min)[b] | MOF | Gel (%) |
|---|---|---|---|---|---|---|---|---|
| 15 | 4 | — | — | — | 57 | 1 | S | 0 |
| 16 | 4 | B | 1.0 | 450 | 46 | 5 | P | 78 |
| 17 | 4 | S | 1.0 | 450 | 52 | 5 | P | 76 |
| 18 | 4 | T | 0.15 | 450 | 56 | 22 | P | 60 |

[a]As measured with a UVIRAD ™ UM365H light bug.
[b]Measured on 12.7 mm × 12.7 mm contact area and 1 kg weight

TABLE II

| Example No. | Copolymer | Photoactive H-Abs. Agent Type | Wt. % | Dose (mJ/cm$^2$)[a] | Peel (N/dm) | Shear (min)[b] | MOF | Gel (%) |
|---|---|---|---|---|---|---|---|---|
| 19 | 1 | — | — | — | 71 | 27 | S | 0 |
| 20 | 1 | B | 1.0 | 450 | 63 | 1122 | S | 25 |
| 21 | 1 | S | 1.0 | 900 | 62 | 597 | P | 34 |
| 22 | 1 | I | 1.0 | 900 | 62 | 295 | P | 19 |
| 23 | 1 | T | 0.15 | 200 | 64 | 198 | P | 31 |
| 24 | 1 | D | 1.0 | 200 | 67 | 550 | P | 45 |
| 25 | 2 | — | — | — | 72 | 89 | S | 0 |
| 26 | 2 | B | 1.0 | 450 | 65 | 254 | P | 51 |
| 27 | 2 | S | 1.0 | 900 | 70 | 237 | P | 60 |
| 28 | 2 | I | 1.0 | 900 | 63 | 537 | P | 50 |
| 29 | 2 | T | 0.15 | 450 | 59 | 950 | P | 60 |
| 30 | 4 | — | — | — | 85 | 65 | S | 0 |
| 31 | 4 | B | 1.0 | 450 | 73 | 72 | P | 65 |
| 32 | 4 | S | 1.0 | 450 | 70 | 165 | P | 52 |

[a]As measured by a UVIRAD ™ UM365H light bug.
[b]Measured on 12.7mm × 12.7 mm contact arrea and 1 kg weight.

Examples 19–32

Toluene solutions of each of copolymers 1, 2, 3, and 4, 0.15 or 1.0 weight percent of B, S, I, or T, and 25 weight percent Regalrez™ 1126 tackifier were prepared. These were coated, dried, and exposed under nitrogen to various doses of UV radiation. The characteristics of each adhesive obtained is given above in Table II.

Table II shows that radiated compositions of the invention containing a tackifier had better shear and peel adhesion than the compositions of Table I.

Examples 33–45

Coatings prepared in several of the above examples were examined according to the Panel Test described previously. The results are detailed in Table III. Masking tapes prepared from non-tackified adhesive compositions (Exs. 33–42) and from tackified adhesive compositions (Exs. 43–45), when irradiated with greater than 450 mJ/cm$^2$ of UV radiation, left little if any residue.

TABLE III

| Ex. No. | Adhesive Sample No. | Panel Tests | | | |
|---|---|---|---|---|---|
| | | % residue left on BC/CC panel after 60 min. at . . . | | % residue left on 50J ™ panel after 60 min. at . . . | |
| | | 121° C. | 150° C. | 121° C. | 150° C. |
| 33 | 1 | 100 | 100 | 100 | 100 |
| 34 | 2 | 5 | 10 | 10 | 10 |
| 35 | 2a | 0 | 2 | 0 | 0 |
| 36 | 6 | 100 | 100 | 100 | 100 |
| 37 | 7a | 0 | 3 | 0 | 1 |
| 38 | 11 | 95 | 100 | 100 | 100 |
| 39 | 12 | 5 | 5 | 7 | 10 |
| 40 | 12a | 0 | 0 | 0 | 0 |
| 41 | 15 | 75 | 100 | 90 | 100 |
| 42 | 16 | 5 | 10 | 0 | 10 |
| 43 | 19 | 100 | 95 | 100 | 100 |
| 44 | 20 | 10 | 50 | 10 | 25 |
| 45 | 20a | 2 | 0 | 0 | 5 |

Sample 2a is the same as Sample 2 except that the former was exposed to 450 mJ/cm$^2$.
Sample 7a is the same as Sample 7 except that the former was exposed to 1200 mJ/cm$^2$.
Sample 12a is the same as Sample 12 except that the former was exposed to 1200 mJ/cm$^2$.
Sample 20a is the same as Sample 20 except that the former was exposed to 1200 mJ/cm$^2$.

Example 46

A one-liter reaction vessel equipped with a mechanical stirrer was dried overnight at 110° C. before being charged with 450 ml distilled toluene, 200 ml 1-hexene, 25 g 4-methyl-1-pentene, and 1 ml 1.8M $(C_2H_5)_2AlCl$ in toluene. After bubbling hydrogen through the stirred solution for one hour, 0.15 g of TICl3 was added. The reaction mixture was allowed to react under these conditions until a slight but significant increase in viscosity was visually observed (about 45 minutes).

Ethylene gas was introduced to the reaction vessel. After 2 hours, ethylene was bubbled through the reaction mixture for 3 additional hours before quenching with methanol. The product was a PSA containing 5 mole percent ethylene units.

The copolymer solution was blended with 15 weight percent Arkon™ P115 tackifier and 1% Coy wt.) benzophenone. The mixture was coated on a 0.04 mm thick PET sheet and exposed to UV radiation.

The cured adhesive had a peel strength of 30N/dm and shear strength of 1320 min as compared to an uncured adhesive of the same composition, which had a peel strength of 30N/dm and a shear strength of 32 minutes as measured on 12.7 mm×12.7 mm contact area and 1 kg weight.

Example 47

The procedure used to prepare Copolymer 1 was repeated. About 400 g 1-hexene and about 52 g 4-methyl-1-pentene produced a tacky, amorphous copolymer that had an IV of about 2.0 and a $T_g$ of about −36° C. This copolymer was found to contain 4.5 mole percent mer units derived from 4-methyl- 1-pentene.

To the toluene solution of the copolymer was added 0.2% (by wt.) benzophenone before the solution was coated onto a PET film and dried (as described in Examples 1–18). Four tapes were cut from the coated PET film and exposed to various doses of UV radiation (see Table IV, below).

The gel content of the resulting cured adhesive for each radiation dose is shown below in Table IV. For comparative purposes, the gel content of polyhexene tapes (i.e., no 4-methyl-1-pentene units), the polyhexene having been cured with the same doses of radiation in the presence of 0.2% (by wt.) benzophenone and having an IV of 2, are also provided.

TABLE IV

| Radiation dose (mJ/cm²) | Gel content of copolymer | Gel content of polyhexene |
|---|---|---|
| 200 | 50 | 35 |
| 300 | 53 | 40 |
| 400 | 55 | 42 |
| 800 | 58 | 45 |

[a]As measured by UVIRAD ™ UM365H light bug.

The data of Table IV show that, for an equivalent dose of UV radiation, the 4-methyl-1-pentene copolymer exhibits at least 25% (by wt.) more gelling than the pure polyolefin.

Examples 48–49

The procedure used to prepare Copolymer 1 was repeated to produce copolymers of hexene and 4-methyl-1-pentene, and a homopolymer of hexene was also prepared (Comparative Example C1). Copolymer 48 had a viscosity of 1.7 dl/g and contained 5.8 mole percent 4-methyl-1-pentene. Copolymer 49 had a viscosity of 1.8 dl/g and contained 9.0 mole percent 4-methyl-1pentene. Comparative Example C1 had a viscosity of 1.9 dl/g.

To solutions of each copolymer and the homopolymer were blended 15% (by wt.) of Regalrez™ 1126 tackdrier and 1% (by wt.) of either benzophenone (B) or 2,4-bis(trichloromethyl)-6-(3',4'-dimethoxyphenyl)-symtriazine (T). Each mixture was coated at a thickness of 50 μm onto a PET sheet (0.04 mm thick) and exposed to a dose of 400 mJ/cm² of UV radiation.

The peel adhesion and shear strength at both room temperature and at 70° C. is given for each in Table V.

TABLE V

| Ex. No. | Photo-active H-Abe Agent | Viscosity (dl/g) | Amount of 4-MeP mole % | Peel Adhesion (N/dm) | Shear Strength 25° C. | Shear Strength 70° C. |
|---|---|---|---|---|---|---|
| 48a | B | 1.7 | 5.8 | 68 | 5000+ | 5000+ |
| 48b | T | 1.7 | 5.8 | 66 | 5000+ | 5000+ |
| 49a | B | 1.8 | 9.0 | 65 | 5000+ | 5000+ |
| 49b | T | 1.8 | 9.0 | 69 | 5000+ | 5000+ |
| 1C | B | 1.9 | 0.0 | 45 | 5000+ | 300 |

Table V shows that, when cured in the presence of a hydrogen abstracting agent, copolymers of hexene and 5.8 or 9.0 mole percent 4-methyl- 1-pentene provides PSAs that have peel adhesions and shear strengths at 70° C. that are superior to PSAs made from pure polyhexene.

Examples 50–51

PSA tapes were prepared and evaluated as described in Examples 48–49 with the following exceptions: (1) octene was used in place of hexene and (2) 35% Coy wt.) Regalrez™ 1126 tackifier was used instead of 15% Coy wt.). The type of hydrogen abstracting agent used, the 4-methyl-1-pentene content, the thickness of the adhesive coating, the viscosity of the adhesive obtained, and the peel adhesion and shear strength at 25° C. and 70° C. of the tapes obtained, are given in Table VI.

TABLE VI

| Ex. No. | Photo-active H-Abs Agent | Coating Thickness (μm) | 4-MeP Content (mole %) | Viscosity (dl/g) | Peel Adhesion (N/dm) | Shear Strength (min) 25° C.[a] | Shear Strength (min) 70° C.[b] |
|---|---|---|---|---|---|---|---|
| 50a | B | 50 | 9 | 2.2 | 72 | 5000+ | 5000+ |
| 50b | T | 50 | 9 | 2.2 | 70 | 5000+ | 5000+ |
| 51a | B | 75 | 9 | 2.2 | 95 | 5000+ | 5000+ |
| 51b | T | 75 | 9 | 2.2 | 96 | 5000+ | 5000+ |
| C2a | B | 50 | 0 | 2.8 | 62 | 5000+ | 903 |

TABLE VI-continued

| Ex. No. | Photo-active H-Abs Agent | Coating Thickness (μm) | 4-MeP Content (mole %) | Viscosity (dl/g) | Peel Adhesion (N/dm) | Shear Strength (min) 25° C.[a] | Shear Strength (min) 70° C.[b] |
|---|---|---|---|---|---|---|---|
| C2b | B | 75 | 0 | 2.8 | 83 | 4500 | 330 |

[a]Measured on 25.4 mm × 25.4 mm contact area and 1 kg weight
[b]Measured on 25.4 mm × 12.7 mm contact area and 500 g weight Table VI shows that, when cured in the presence of a hydrogen abstracting agent, a polyoctene/4-methyl-1-pentene copolymer provides PSAs that have peel adhesions and shear strengths at 70° C. that are superior to those of pure polyoctene PSAs.

Various modifications and alterations which do not depart from the scope and spirit of this invention will become apparent to those skilled in the art. This invention is not to be unduly limited to the illustrative embodiments set forth therein.

We claim:

1. A composition comprising:

a) at least one copolymer having the general formula

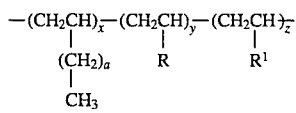

wherein x, y, and z are numbers designating the relative molar amounts of monomer units comprising the backbone chain of the copolymer such that (1) the sum (x+ y+ z) is about 35 to 400,000, and (2) z is 0.1 to 9.9%, y is 0 to 30%, and x is 60.1 to 99.9% of the sum (x+ y+ z);

a is an integer from 3 to 7, inclusive;

R is hydrogen or a lower alkyl group; and $R^1$ is a monovalent organic group, having the structure

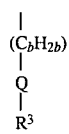

wherein b is an integer from 1 to 5,

Q is a single bond, oxygen, or a divalent group selected from the class consisting of an arylene group having 6 to 15 carbon atoms and

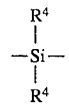

in which each $R^4$ is independently a lower alkyl group of 1 to 4 carbon atoms or $R^3$; and $R^3$ is a methylidyne group having the formula

in which (1) each $R^5$ is independently an alkyl group having 1 to 4 carbon atoms or (2) both $R^5$s together provide an alkylene group that, with the methylidyne carbon to which they are attached, forms a 5- or 6-membered ring of carbon atoms, with the proviso that b can be zero when Q is an arylene group;

b) sufficient photoactive hydrogen abstracting agent to crosslink said composition upon exposure to radiation, said hydrogen abstracting agent being selected from the group consisting of aldehydes, ketones, quinones, thioxanthones, and chromophore-substituted halomethyl-s-triazines; and c) optionally, a tackifying resin, said composition being radiation curable to a pressure sensitive adhesive having peel adhesion of at least 35N/dm both in the presence and absence of said tackifying resin.

2. The composition of claim 1 wherein y is 0.1 to 30 percent of the sum of (x+ y+ z).

3. The composition of claim 1 wherein said copolymer has a glass transition temperature from about −70° to about 0° C.

4. The composition of claim 1 wherein said copolymer has an inherent viscosity from about 0.4 to about 9.0 dl/g.

5. The composition of claim 1 wherein said copolymer has a number average molecular weight from about 5,000 to about 50,000,000.

6. The composition of claim 1 wherein said photoactive hydrogen abstracting agent is a substituted or unsubstituted benzophenone.

7. The composition of claim 1 wherein said photoactive hydrogen abstracting agent is present in the range of about 0.05 to about 3.0 percent by weight of the curable composition.

8. The composition of claim 1 wherein said tackifying resin is present in an amount of more than zero to about 150 parts by weight per 100 parts by weight of said copolymer.

9. The composition of claim 1 further comprising an effective amount of at least one adjuvant selected from the class consisting of pigments, dyes, plasticizers, fillers, stabilizers, ultraviolet absorbers, antioxidants, and processing oils.

10. The composition of claim 1 wherein said pressure sensitive adhesive, prepared by radiation curing said composition, has a peel adhesion value of at least 35N/dm.

11. A pressure sensitive adhesive prepared by exposing the composition of claim 1 to radiation.

12. The pressure sensitive adhesive of claim 11 wherein said radiation is electron beam or actinic.

13. A hot melt adhesive comprising the composition of claim 1.

14. The composition of claim 1 wherein z is 1 to 9.9% of the sum (x+y+z).

15. The composition of claim 14 wherein z is 1 to 4.9% of the sum (x+y+z).

16. The composition of claim 1 wherein x is 60.1 to 95% of the sum (x+ y+ z).

17. The composition of claim 1 wherein y is 1 to 25% of the sum (x+y+z).

18. The composition of claim 7 wherein said photoactive hydrogen abstracting agent is present in the range of 0.1 to 2.0 weight percent of the curable composition.

19. The composition of claim 18 wherein said photoactive hydrogen abstracting agent is present in the range of 0.5 to 1.5 weight percent of the curable composition.

20. The composition of claim 1 wherein said tackifying resin is present in an mount up to 150 parts by weight per 100 pbw polymer.

* * * * *

UNITED STATES PATENT AND TRADEMARK OFFICE
CERTIFICATE OF CORRECTION

PATENT NO.: 5,559,164

DATED: September 24, 1996

INVENTOR(S): Gaddam N. Babu and James R. Peterson

It is certified that error appears in the above-identified patent and that said Letters Patent is hereby corrected as shown below:

Col. 3, line 59, "N/din" should read --N/dm--.
Col. 6, line 54, "olefins" should read --$\alpha$-olefins--.
Col. 7, line 43, after "X", insert --is--.
Col. 12, line 66, "m/rain" should read --m/min--.
Col. 13, Table I, line 9, col. 3, "1" should read --I--.
Col. 17, line 12, "Coy" should read --(by--.
Col. 18, line 15, "2,4-bis(trichloromethyl)-6-(3',4'-dimethoxyphenyl)-symtriazine" should read --2,4-bis(trichloromethyl)-6-(3',4'-dimethoxyphenyl)-sym-triazine--.
Col. 18, lines 48 and 49, "Coy" should read --(by--.
Col. 22, line 9, "mount" should read --amount--.

Signed and Sealed this

Fourth Day of February, 1997

Attest:

BRUCE LEHMAN

Attesting Officer

Commissioner of Patents and Trademarks